2,899,409
RUBBER-LIKE COPOLYMERS AND PROCESSES FOR THEIR PRODUCTION

Glenn A. Nesty and Edward W. Pietrusza, Morris Township, Morris County, N.J., assignors to Allied Chemical Corporation, a corporation of New York No Drawing. Application July 1, 1955
Serial No. 519,622

14 Claims. (Cl. 260—75)

This invention is directed to the production of tough, rubber-like products from macromolecular copolyesters of 4,4'-dicarboxydiphenylsulfone and $C_2$ to $C_8$ straight chain alkane dicarboxylic acids (polymethylene dicarboxylic acids containing 2 to 8 methylene groups) with $C_2$ to $C_{10}$ alkane diols or alkane diol ethers containing 2 to 8 carbon atoms and 1 to 3 ether oxygen atoms in a hetero-chain structure, $C_2$ to $C_{10}$ alkane diisocyanates, $C_5$ to $C_6$ cycloalkane diisocyanates or phenylene or $C_1$ to $C_4$ alkyl substituted phenylene diisocyanates, in which diisocyanates the two isocyanate substituted carbon atoms are separated by at least one other carbon atom, i.e. the isocyanate radicals are on non-adjacent carbon atoms. This invention is further directed to the tough, rubbery polymeric products of those processes.

Methods are known whereby polyesters of aromatic dicarboxylic acids with glycols may be prepared. Of this type of product, the polyesters of terephthalic acid and ethylene glycol have been found to be microcrystalline in structure and when stretched at temperatures substantially below their melting points become oriented. As a result of these and other properties they are peculiarly suitable for making fibers and have been commercially developed in the form of "Terylene" and "Dacron" in England and in the United States, respectively. Similar methods are known for preparing mixed polyesters of terephthalic acid and aliphatic dicarboxylic acids such as adipic or sebacic acid with the aliphatic glycols or glycol ethers. These generally give lower melting polyesters of decreased crystallinity, hence are less desirable for fiber production, but have been said to be well adapted for making films, with or without modification by treatment with organic diisocyanates.

In the field of rubber chemistry highly elastic, rubberlike polyurethane products have been prepared by reaction of organic diisocyanates with polyesters. In Germany the development of these products first proceeded along the lines of preparing polyesters of adipic acid and glycol with some glycerol (a trifunctional alcohol) present. These were then treated with an organic diisocyanate to form the rubbery products. Later the treatment of linear polyesters of glycols and dicarboxylic acids with organic diisocyanates was studied. Variations in glycol, acid and diisocyanate were tried. The polyester of ethylene glycol and adipic acid treated with hexamethylene diisocyanate hardened at once. Expansion of the structure of the diisocyanates led to improved elastic properties of the products, but a tendency to harden in storage remained. Variation in the polyesters to employ those with higher melting points than the ethylene glycol-adipic acid polyester generally gave products which tended to harden, while low melting polyesters gave products which retained their elasticity even on long storage. Expansion of the structure of the polyester (e.g. an ethylene glycolphthalic acid polyester) did relatively little good because the tendency to harden increased. With this background, efforts toward further improvements in this type of synthetic rubbers have been directed toward the exploration of the effects of various high molecular weight aromatic diisocyanates as a modifying constituent of the polyesters.

We have now discovered that by reacting with certain organic diisocyanates under defined conditions a macromolecular weight polyester of 4,4'-dicarboxydiphenylsulfone and certain alkane dicarboxylic acids with certain alkane diols, tough, rubber-like products are obtained which retain their rubbery character over long periods of time without appreciable hardening. These products are characterized by a combination of properties with respect to high melting points, high deformation, high sticking, and extremly low brittle points, making them superior to other known polyester compositions. The several characteristics of these particular diisocyanate-modified aromatic acid-aliphatic acid-glycol or glycol ether polyesters make them especially useful in the form of moldings and films which are highly elastic, tough and flexible. They are useful in the rubbery industry for making the various articles for which rubber is commonly used.

The processes for preparing the novel, modified polymeric materials to which our invention is directed involve reacting a $C_3$ to $C_{10}$ alkane diisocyanate (e.g. tetramethylene or hexamethylene diisocyanate), a $C_5$ to $C_6$ cycloalkane diisocyanate (e.g. cyclohexane-1,4 diisocyanate), or a phenylene or a $C_1$ to $C_4$ alkyl substituted phenylene diisocyanate (e.g., m-toluene diisocyanate, 3,3'-bitoluene-4,4'diisocyanate and methylene diphenyl-4,4'-diisocyanate), in all of which two isocyanate substituted carbon atoms are separated by at least one unsubstituted carbon atom, with a macromolecular copolyester of 4,4'-dicarboxydiphenylsulfone and polymethylene dicarboxylic acid containing 2 to 8 methylene groups with a polymethylene glycol containing 2 to 10 methylene groups or a polymethylene glycol ether containing 2 to 8 methylene radicals and 1 to 3 ether oxygen atoms in a hetero-chain structure. Instead of a single diisocyanate, two or more of these compounds may be reacted with the polyester. Also, the polyester may have a composition corresponding to the reaction product of two or more alkane dicarboxylic acids and alkane diols or alkane diol ethers, having the described structures, with the 4,4'-dicarboxydiphenylsulfone. Preferably, a polymethylene diisocyanate containing 4 to 8, better 6, methylene groups, is reacted with the macromolecular copolyester. The copolyester is preferably a copolyester of 4,4'-dicarboxydiphenylsulfone and adipic acid with one or more polymethylene diols containing 2 to 6 methylene groups.

The terminal groups of the copolyesters treated with the diisocyanate in accordance with this invention are practically all hydroxy (alcoholic) radicals; thus the OH number of the copolyester is 27 to 7, preferably 12 to about 8. There is a theoretical possibility of some acid terminal groups being present in the copolyester, but their number would be insignificant as compared with the hydroxy terminal groups present. The copolyesters suitable for preparing the rubbery products of our invention are further characterized by containing about 0.1 to 0.7, preferably substantially 0.2 to 0.3, 4,4'-dicarboxydiphenylsulfone units,

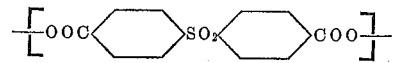

for every one alkane dicarboxylic acid unit,

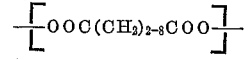

For every two hydroxy mol radicals present in the polyester, more than one mol, preferably about 6 to 15 mols, of the diisocyanate are reacted with the polyester. A large excess of diisocyanate over these amounts may be supplied, the excess over that which reacts with the polyester being removed before or during the subsequent heating of the diisocyanate-treated polyester with a cross-linking agent.

The polyester is reacted with the diisocyanate and the diisocyanate-treated polyester is further reacted in the presence of at least a small amount of a cross-linking agent at temperatures at which reaction of the diisocyanate-treated polyester to form the rubbery polymer is reasonably rapid. When masses of the polyester of any considerable size are to be treated with the diisocyanate, to promote their reaction, it is preferred to dissolve the polyester in a suitable solvent, e.g. chloroform, and incorporate the diisocyanate in the solution of polyester. In so operating, even at room temperatures of 20–25° C., the diisocyanate reacts with the polyester in the course of several hours. Heating the mixed materials accelerates the reaction. The reaction takes place readily, however, so that it occurs even when the solid finely divided polyester or a thin layer of the solid polyester is exposed to contact with the disocyanate, e.g. when a film of the polymer is exposed to an atmosphere containing vapors of the diisocyanate.

After addition of the cross-linking agent the further reactions of the diisocyanate-treated polyester occur slowly at ordinary temperatures and are best accelerated by heating. During the heating after incorporation of the cross-linking agent, the molecular weight of the polymeric material substantially increases with cross-linking between the chains of the polymer molecule. The physical characteristics of the polymeric material are substantially altered not only with respect to those characteristics resulting from increase in molecular weight, but particularly with respect to the polymer becoming increasingly more rubbery (increasingly elastic) as the formation of cross-linkages in the polymer molecules progresses. These changes will be more particularly illustrated in connection with specific examples of methods for making the polymers to which our invention is directed.

As cross-linking agent we prefer to employ water. Polyfunctional materials containing at least two active hydrogen atoms may be employed; for example, polyhydroxy alkanes such as glycols or glycerol, primary or secondary alkane polyamines, such as ethylene diamine or N,N'dimethyl ethylene diamine, hydroxy alkane amines, such as ethanolamine, etc. Instead of a cross-linking agent itself, a material which forms a cross-linking agent under the conditions maintained during treatment of the polyester with the diisocyanate may be employed to the same effect as the cross-linking agent itself.

The cross-linking agent may be added to and incorporated with a solution or melt of the polyester-diisocyanate. The cross-linking agent as liquid or vapor may be absorbed in finely divided polyester-diisocyanate or a film thereof and effect the desired reaction of the diisocyanate-treated polyester, for example, by heating the latter in an atmosphere of steam, or a humid atmosphere.

The cross-linking agent thus incorporated in the diisocyanate-treated polyester chemically reacts therewith. Small amounts of agent are all that are needed for this purpose, as is evidenced by the fact that the required amount of water, for example, is absorbed by contacting a film of the solid polyester-diisocyanate with liquid water or with a humid atmosphere or steam. We prefer to employ cross-linking agent amounting to substantially 10% to about 30% by weight of the diisocyanate, to obtain products which are highly elastic and flexible. Large excesses of cross-linking agent above this 30% are disadvantageous only in that they complicate the processing of the mixture and, except in the case of water, increase cost for materials entering into production of the products. As pointed out, substantially less than the preferred amount may be used if products of lesser elasticity and flexibility are desired, but at least a small amount of cross-linking agent must be present during the reaction of the diisocyanate-treated polyester to impart elasticity to the product.

The temperature to which the polyester-diisocyanate is heated in the presence of the cross-linking agent is governed only by the time allowed for heating the material to obtain the desired modification in the properties of the polymer and, as regards maximum suitable temperatures, by the tendency of the polymeric material to decompose, with discoloration, at excessively high temperatures. In general, reaction of the polyester-dissocyanate and cross-linking agent may be accomplished in a short time without undue discoloration of the product by heating at temperatures of about 100° C. to about 150° C.

The molecular structure of the polymeric materials of our invention is characterized by ester chains of 4,4'-dicarboxydiphenylsulfone and adipic acid units or units of other polymethylene dicarboxylic acid containing 2 to 8 methylene groups alternating with polymethylene units or polymethylene ether units. These acid units have the structure shown above. The polymethylene units have the structure $$(CH_2)_x$$

where $x$ represents a whole number of the series 2 to 10, and in the preferred polyester is a whole number of the series 2 to 6. The polyester chains in the preferred polyesters of 4,4'-dicarboxydiphenlysulfone, adipic acid and $C_2$ to $C_6$ polymethylene diols have the structure

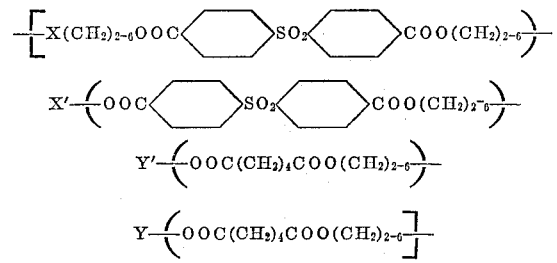

where X and Y represent natural numbers 0–2 and their sum equals 2. X' and Y' represent whole numbers with values such that the ratio X+X'/Y+Y' is in the range 0.1–0.7/1, preferably is 0.2–0.3/1. In the ester chain structure of the polymeric material of our invention the internal valences, designated by $\rangle$ and $\langle$, mutually satisfy each other.

The molecular structure of our polymeric materials essentially consists of a plurality of the polyester chains interconnected by urethane and urea linkages derived from the diisocyanate and cross-linking agent used. When water is the cross-linking agent, the following structures, forming a part of these linkages, characterize their three types, some or all of which are present in our products:

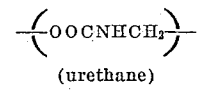

(urethane)

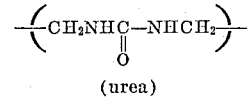

(urea)

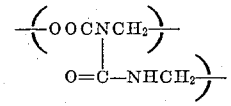

(urethane-urea combination)

Between any two adjacent ester chains (the linking of which results in chain extension of the polyesters) and between any three adjacent ester chains (the linking of which results in both chain extension and cross-linking of polyester chains) these urethane and urea linkages are associated with the carbon chains of the diisocyanate and cross-linking agent to form the linkages, characterized in our preferred polymeric materials by containing polymethylene diisocyanate units (having the structure

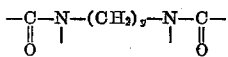

where y represents a whole number of the series 4 to 8, uniting the polyester chains to form the molecular structure of our rubbery polymeric products. The total diisocyanate units in the products of our invention, as determined by analysis of those products for their nitrogen content, usually amounts to 5% to 15% by weight of the product.

Our invention is further illustrated by the following specific examples of methods for carrying out our process and products obtained thereby. In these examples the tensile strength and ultimate elongation data are determined from tests made using an Instron machine.

*Example 1.*—A solution of ethyl adipate in ethylene glycol in the mol ratio of 4 of ethylene glycol to 1 of ethyl adipate, to which about 0.1% (by weight of the solution) of zinc silicofluoride has been added, is heated in a stream of oxygen-free nitrogen under a reflux condenser for about seven hours at 195–215° C. and 750 mm. Hg absolute pressure. The temperature of the reflux condenser is such that ethanol formed by ester interchange of the ethyl adipate and the ethylene glycol escapes without substantial loss of reactants. There is then added 0.25 mol 4,4′-dicarbmethoxydiphenylsulfone for every 1 mol of the ethyl adipate (0.25 4,4′-dicarboxydiphenylsulfone units for every 1 adipic acid unit), and the solution heated for an additional 2½ hours at temperatures rising to 228° C. Methanol formed by ester interchange of the sulfone methyl ester and ethylene glycol present is evolved. At the end of this heating, the ester interchange is substantially completed and the ethanol and methanol formed removed.

The reaction mixture is then placed under a reduced pressure of 0.3 mm. Hg and heated for about 7 hours at temperatures ranging from about 217° C. to about 260° C., with a small flow of nitrogen gas being passed through the heated material.

Employing this procedure, the ethylene glycol esters of adipic acid and of 4,4′-dicarboxydiphenylsulfone are formed and are copolymerized, with evolution of ethylene glycol. The polymer thus formed is washed out of the polymerization vessel with dry chloroform. The solid copolymer is refluxed with dry chloroform and undissolved material filtered from the solution. This solution is concentrated by evaporation to 16.2% polyester and refiltered under nitrogen pressure. The polyester thus obtained in solution in chloroform has hydroxyl radicals as terminal groups, an OH number of about 11.0 and contains a ratio of substantially 0.25/1 4,4′-dicarboxydiphenylsulfone/adipic acid units.

Hexamethylene diisocyanate is added to this solution of copolyester in the proportions of 0.49 mol diisocyanate for every 2.5 total mols of ethyl adipate and 4,4′-dicarbmethoxydiphenylsulfone employed in preparing the copolyester. This corresponds to about 7.0 gram mols of hexamethylene diisocyanate for every 2 gram mol radicals of OH in the polyester. The solution is allowed to stand for one hour and is then spread on a casting surface. The cast solution, under a cover permitting access of the air to the surface of the solution, is allowed to stand at room temperature for one hour to permit evaporation of chloroform. The film thus deposited on the casting surface is heated in an oven at 120° C. for 16 hours. The resulting film is removed from the casting surface by immersion in warm water. The film is again heated, in an oven at about 120° C. for 3 hours. The necessary amount of water required to induce cross-linking during this heating is absorbed by the film from the water contacted therewith. The film was found to contain 2.15% nitrogen. This corresponds to a reaction product of 12.9% by weight of hexamethylene diisocyanate and 87.1% of the polyester, and to substantially 6.9% by weight of total diisocyanate units present in urethane-urea, urethane and urea linkages in the polymeric product. It also corresponded to 6.4 gram mols of the hexamethylene diisocyanate reacted with the polyester for every 2 gram mol radicals of OH contained therein.

The product prepared by the procedure of this example was an elastic, transparent, flexible, tough film having the following properties:

| | |
|---|---|
| Thickness | 0.0017″. |
| Melting point | About 235°. |
| Sticking point | About 210°–220° C. |
| Brittle point | Below —80° C. |
| Tensile strength | 2880 p.s.i. |
| Ultimate elongation | 516%. |
| Drop impact strength at 25° C. | 80″. |
| Drop impact strength at —40° C. | 20″. |
| Thwing tear strength | 73–78 g. |
| Elmendorf tear strength | 26–28 g. |

Films made by casting a solution in chloroform of the same polyester as employed above but without reaction with the hexamethylene diisocyanate had a melting point of 160°–170° C. and softened and stuck to glass at 110°–120° C. They had a tensile strength of about 850 p.s.i., and an ultimate elongation of only about 260% with less elasticity.

Another film was made from a 10% $CHCl_3$ solution of a similarly prepared polyester having an OH number of about 11.4 by casting onto a glass plate and allowing the chloroform to evaporate slowly. The film deposited on the casting surface was then heated in an oven at 130° C. for 16 hours in the presence of vapors of hexamethylene diisocyanate. Following this treatment, the film was removed from the casting surface by immersion in warm water and again heated in an oven at about 120° C. for three hours. The film was found to contain 3.72% nitrogen which is equivalent to a 22.4% hexamethylene diisocyanate content, corresponding to about 12.0 gram mols of the diisocyanate for every two gram mol hydroxy radicals in the copolyester and to substantially 12.6% by weight of the product of diisocyanate units in the urethane, urea and urethane-urea linkages present therein.

The tensile strength of this film was 3250 p.s.i. and its ultimate elongation at break was 1010%. The film remained elastic at —82° C.

*Example 2.*—Adipic acid and ethylene glycol in the mol ratio of 1/2 were mixed and heated until the mixture became molten. The melt was further heated at temperatures rising to 227° C. for about 6 hours. Water vapor was evolved and the glycol ester of the adipic acid was formed. There was then added 0.25 mol 4,4′-dicarbmethoxydiphenylsulfone for every 1 mol adipic acid initially introduced and about 0.2% zinc silicofluoride (based on the weight of the sulfone added) as catalyst. This mixture was then heated for 4 hours at temperatures of 203° C. to 230° C., at which methanol distills off.

Following this conversion of the adipic acid and sulfone methyl ester to their esters of ethylene glycol, a vacuum was applied and the heating continued for a period of about 5 hours, with temperatures rising to 224° C. and the vacuum being reduced from 80 mm. Hg to 4.8 mm. Under these conditions, glycol distilled over and polymerization of the mixed glycol esters was started. Polymerization was continued by further heating for a period of about 12 hours at temperatures of about 220° C. and under pressures reduced to below 1 mm. Hg and maintained at about 0.2 mm. Hg during the last half of this final heating period.

The resulting polyester, of which the terminal groups were hydroxyl, had an OH number of 8–9 and contained substantially 0.25 4,4'-dicarboxydiphenylsulfone units for every 1 adipic acid unit. A solution of this polyester in chloroform, after being filtered, was cast on a plate and after standing for ½ hour to permit evaporation of the chloroform, was heated for 2 hours at 145° C. in an oven in which a dish containing hexamethylene diisocyanate was placed so that the film was in an atmosphere containing vapors of this diisocyanate. The dish of hexamethylene diisocyanate was then removed and the film left in the oven for 1 hour to permit evaporation of excess diisocyanate. Absorbent paper wet with water was then put in the oven to form an atmosphere containing water vapor in which the film was heated at 145° C. for a further period of 3 hours. Following this treatment, the film was stripped from the plate on which it was cast.

Film made in this manner had a tensile strength of 1600 p.s.i. and an ultimate elongation of 640%. It was an elastic, transparent, highly flexible film.

When the same polyester in solution in chloroform was mixed with about 6.6 gram mols of hexamethylene diisocyanate for every 2 gram mol radicals of OH contained in the polyester and film cast from the resulting solution heated at 145° C. in an oven first for 6 hours, followed by introduction into the oven of paper wet with water and continuing the heating at 145° C. for 6 hours. The quantity of hexamethylene diisocyanate employed corresponded to 10.7% hexamethylene diisocyanate in the end product and 5.63% isocyanate units available to form urethane, urethane-urea, and urea units. The resulting film had a tensile strength of 2700 p.s.i. and an ultimate elongation of 600%. The modulus of this film at 300% elongation was 1100 p.s.i. More than a year later, after exposure to normal conditions existing in a laboratory building, a test sample of this same film showed a tensile strength of 2600 p.s.i. and an ultimate elongation of 500%. Its immediate recovery from stretch at 200% elongation was 97% and at 300% elongation, 94%.

*Example 3.*—A polyester of 4,4'-dicarboxydiphenylsulfone, adipic acid and ethylene glycol was prepared by a procedure essentially the same as that described in Example 2 above. This polyester had an OH number of approximately 9.6 and contained about 0.25 4,4'-dicarboxydiphenylsulfone units for every 1 adipic acid unit. A 10% solution of this copolyester in chloroform was prepared and filtered. To 16.7 parts by weight of this polymer solution, 0.52 part of hexamethylene diisocyanate was first added. This corresponded to about 15.3 gram mols of the diisocyanate for every 2 gram mol radicals of OH in the copolyester, to 23.5% hexamethylene diisocyanate in the end product and to 13.4% isocyanate units present capable of forming urethane, urethane-urea, and urea units. About 10% by weight water as cross-linking agent, based on the diisocyanate used, was then added.

The resulting solution was cast as a film on a plate which was placed in a refrigerator to slow up the rapid reactions induced by the addition of water at room temperature. After several hours in the refrigerator, the plate bearing the film was placed in an oven at about 130° C. for several hours. The film was removed from the plate by immersion in water and dried at about 130° C. The film thus prepared had a tensile strength of 2900 p.s.i. and an ultimate elongation of 600%. More than a year later, this same film was found to have a tensile strength of 2300 p.s.i., an ultimate elongation of 500% and its recovery from stretch at 300% elongation was 95%.

The copolyesters of 4,4'-dicarboxydiphenylsulfone and alkane dicarboxylic acids with alkane diols or diol ethers used in carrying out our invention may be prepared by the usual methods for making polyesters and copolyesters of dicarboxylic acids and glycols or glycol ethers. The particular procedures described in the foregoing examples for preparing these copolyesters are illustrative of such methods, but our invention is not limited thereto.

The examples illustrate the copolyesters of 4,4'-dicarboxydiphenylsulfone and adipic acid preferably employed and our preferred methods for treating them with hexamethylene diisocyanate and cross-linking agent to make films and molded products. By varying the particular copolyesters and diisocyanates employed and the processing conditions of the examples, the properties of the resulting products may be modified. For example, as the ratio of sulfone to alkane dicarboxylic acid units in the polyester treated is increased, the melting points and brittleness of the products tend to increase. Within the ranges of polyester composition and conditions with respect to reacting the polyesters with diisocyanate disclosed above, desirable tough, rubber-like products are obtained employing the copolyesters of the sulfone and any of the $C_2$ to $C_8$ straight chain dicarboxylic acid copolyesters with any of the $C_2$ to $C_{10}$ alkane diols or $C_2$ to $C_8$-$O_1$ to $O_3$ alkane diol ethers and treating them with any of the alkane, cycloalkane or phenylene or alkyl substituted phenylene diisocyanates having the compositions hereinabove particularly described.

We claim:

1. The process for producing a tough, rubber-like material which comprises reacting a diisocyanate from the group consisting of the $C_3$ to $C_{10}$ polymethylene diisocyanates, the $C_5$ to $C_6$ cycloalkane diisocyanates, the phenylene diisocyanates, said diisocyanates all being characterized by containing two isocyanate substituted carbon atoms separated by at least one unsubstituted carbon atom, m-toluene diisocyanate, 3,3'bitoluene-4,4'diisocyanate and methylene diphenyl-4,4'-diisocyanate, with a copolyester of 4,4'-dicarboxydiphenylsulfone and at least one polymethylene dicarboxylic acid containing 2 to 8 methylene groups with at least one diol from the group consisting of the polymethylene glycols containing 2 to 10 methylene groups and the polymethylene glycol ethers containing 2 to 8 methylene groups and 1 to 3 ether oxygen atoms in a hetero-chain structure, which copolyester is characterized by having an OH number of 27 to 7, substantially all its terminal groups being hydroxy radicals, and by containing about 0.1 to 0.7 4,4'-dicarboxydiphenylsulfone units for every 1 alkane dicarboxylic acid unit, by mixing with said copolyester more than 1 gram mol of said diisocyanate for every 2 gram mol radicals of OH contained in the copolyester, incorporating with the resulting diisocyanate-treated copolyester, a polyfunctional cross-linking agent containing at least 2 active hydrogen atoms from the group consisting of water, the polyhydroxy alkanes, primary and secondary alkane polyamines, and the hydroxy alkane amines, and maintaining the mixture of cross-linking agent and diisocyanate-treated copolyester at reaction temperatures below those at which the polymer decomposes until said tough, rubber-like material is formed.

2. The process of claim 1 in which the diisocyanate is a $C_3$ to $C_{10}$ polymethylene diisocyanate having the isocyanate radicals on non-adjacent carbon atoms and the diol of the copolyester is a polymethylene diol containing 2 to 6 methylene groups.

3. The process for producing a tough, rubber-like material which comprises reacting a polymethylene diisocyanate containing 4 to 8 methylene groups with a copolyester of 4,4'-dicarboxydiphenylsulfone and adipic acid with at least one polymethylene diol containing 2 to 6 methylene groups, which copolyester is characterized by having an OH number of 27 to 7, substantially all its terminal groups being alcoholic hydroxy radicals, and by containing about 0.1 to 0.7 4,4'-dicarboxydiphenylsulfone units for every 1 adipic acid unit, by mixing with said copolyester more than 1 gram mol of said diisocyanate for every 2 gram mol radicals of OH contained in the copolyester, incorporating with the resulting diisocyanate-treated copolyester a polyfunctional cross-linking agent containing at least 2 active hydrogen atoms from the group consisting of water, the polyhydroxy alkanes, primary and secondary alkane polyamines, and the hydroxy alkane amines, and maintaining the mixture of cross-linking agent and diisocyanate-treated copolyester at reaction temperatures below those at which the polymer decomposes until said tough, rubber-like material is formed.

4. The process of claim 3 in which the copolyester of 4,4'-dicarboxydiphenylsulfone and adipic acid with polymethylene diol has an OH number of 12 to about 8 and contains substantially 0.2 to 0.3 4,4'-dicarboxydiphenylsulfone units for every 1 adipic acid unit.

5. The process of claim 3 in which the copolyester of 4,4'-dicarboxydiphenylsulfone and adipic acid has a hydroxyl number of 12 to about 8 and is treated with about 12 gram mols of the diisocyanate for every 2 gram mol radicals of OH contained in the copolyester.

6. The process of claim 3 in which a copolyester of 4,4'-dicarboxydiphenylsulfone and adipic acid with ethylene glycol having an OH number of 12 to about 8 and containing about 0.1 to 0.7 4,4'-dicarboxydiphenylsulfone units for every 1 adipic acid unit, is reacted with hexamethylene diisocyanate and with water as cross-linking agent.

7. The process of claim 3 in which a copolyester of 4,4'-dicarboxydiphenylsulfone and adipic acid with ethylene glycol having an OH number of 12 to about 8 and containing substantially 0.2 to 0.3 4,4'-dicarboxydiphenylsulfone units for every 1 adipic acid unit is reacted with hexamethylene diisocyanate in amount corresponding to about 12 gram mols of the diisocyanate for every 2 gram mol radicals of OH contained in the polyester and with water as cross-linking agent.

8. A new polymeric material which is the reaction product of a diisocyanate from the group consisting of the C₃ to C₁₀ polymethylene diisocyanates, the C₅ to C₈ cycloalkane diisocyanates, the phenylene diisocyanates, said diisocyanates all being characterized by containing two isocyanate substituted carbon atoms separated by at least one unsubstituted carbon atom, m-toluene diisocyanate, 3,3'bitoluene - 4,4' - diisocyanate and methylene diphenyl-4,4'-diisocyanate, with a copolyester of 4,4'-dicarboxydiphenylsulfone and at least one polymethylene dicarboxylic acid containing 2 to 8 methylene groups with at least one diol from the group consisting of the polymethylene glycols containing 2 to 10 methylene groups and the polymethylene glycol ethers containing 2 to 8 methylene groups and 1 to 3 ether oxygen atoms in a hetero-chain structure, which copolyester is characterized by having an OH number of 27 to 7, substantially all its terminal groups being hydroxy radicals, and by containing about 0.1 to 0.7 4,4'-dicarboxydiphenylsulfone units for every 1 alkane dicarboxylic acid unit, in the proportions of more than 1 gram mol of said diisocyanate for every 2 gram mol radicals of OH contained in the copolyester and a polyfunctional cross-linking agent containing at least 2 active hydrogen atoms from the group consisting of water, the polyhydroxy alkanes, primary and secondary alkane polyamines, and the hydroxy alkane amines.

9. A new polymeric material which is the reaction product of a polymethylene diisocyanate containing 4 to 8 methylene groups with a copolyester of 4,4'-dicarboxydiphenylsulfone and a polymethylene dicarboxylic acid containing 2 to 8 methylene groups with a polymethylene diol containing 2 to 6 methylene groups, which copolyester is characterized by having an OH number of 27 to 7, substantially all its terminal groups being alcoholic hydroxy radicals, and by containing about 0.1 to 0.7 4,4'-dicarboxydiphenylsulfone units for every polymethylene dicarboxylic acid unit, in the proportions of more than 1 gram mol of said diisocyanate for every 2 gram mol radicals of OH contained in the copolyester, and water as a cross-linking agent.

10. A new polymeric material of claim 9, further characterized by having in its molecular structure ester chains containing a plurality of dicarboxylic acid units consisting of 4,4'-dicarboxydiphenylsulfone units having the structure

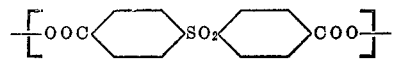

and adipic acid units having the structure $$\{OOC(CH_2)_4COO\}$$

alternating with polymethylene units having the structure $(CH_2)_x$ in which $x$ represents a whole number of the series 2 to 6, in the ratio of about 0.1/0.7 of said 4,4'-dicarboxydiphenylsulfone units for every 1 of said adipic acid units, said ester chains being interconnected by linkages of the group consisting of urethane linkages having the structure $\{OOCNHCH_2\}$, urea linkages having the structure

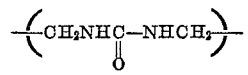

and urethane-urea linkages having the structure

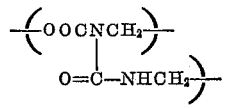

associated with the carbon chains of diisocyanate units having the structure

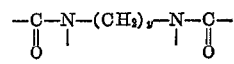

in which $y$ represents a whole number of the series 4 to 8.

11. The polymeric material of claim 10 in which the total of the diisocyanate units is greater than 5% by weight of the polymeric material.

12. The polymeric material of claim 11 in which the ratio of the 4,4'-dicarboxydiphenylsulfone units to adipic acid units is substantially 0.2–0.3 to 1 and the total of diisocyanate units amounts to 5% to 15% by weight of said polymeric material.

13. The process of claim 1 in which the mixture of cross-linking agent and diisocyanate treated polyester is maintained at temperatures in the range 20° C. to about 150° C.

14. The process of claim 3 in which the mixture of cross-linking agent and diisocyanate treated polyester is maintained at temperatures in the range 20° C. to about 150° C.

References Cited in the file of this patent

UNITED STATES PATENTS

| | | |
|---|---|---|
| 2,614,120 | Caldwell | Oct. 14, 1952 |
| 2,625,531 | Seeger | Jan. 13, 1953 |
| 2,727,881 | Caldwell | Dec. 20, 1955 |
| 2,744,088 | Caldwell | May 1, 1956 |
| 2,744,091 | Caldwell | May 1, 1956 |

FOREIGN PATENTS

| | | |
|---|---|---|
| 894,134 | France | Dec. 14, 1944 |
| 495,850 | Belgium | Nov. 20, 1950 |
| 831,722 | Germany | Feb. 18, 1952 |

OTHER REFERENCES

"The Van Nostrand Chemist's Dictionary," p. 516, D. Van Nostrand Co., Inc., N.Y., 1953. (Copy in S.L.)